(12) United States Patent
McClure

(10) Patent No.: US 12,312,539 B2
(45) Date of Patent: May 27, 2025

(54) REACTION VESSEL FOR LIQUID PHASE CATALYTIC PYROLYSIS OF POLYMERS

(71) Applicant: Vance E. McClure, Cardiff-by-the-Sea, CA (US)

(72) Inventor: Vance E. McClure, Cardiff-by-the-Sea, CA (US)

( * ) Notice: Subject to any disclaimer, the term of this patent is extended or adjusted under 35 U.S.C. 154(b) by 177 days.

(21) Appl. No.: 17/916,983

(22) PCT Filed: Apr. 7, 2021

(86) PCT No.: PCT/US2021/026259
§ 371 (c)(1),
(2) Date: Oct. 4, 2022

(87) PCT Pub. No.: WO2021/207413
PCT Pub. Date: Oct. 14, 2021

(65) Prior Publication Data
US 2023/0167367 A1    Jun. 1, 2023

Related U.S. Application Data

(60) Provisional application No. 63/006,540, filed on Apr. 7, 2020.

(51) Int. Cl.
*C10B 47/34*    (2006.01)
*B01J 19/18*    (2006.01)
*C10B 47/36*    (2006.01)
*C10B 53/07*    (2006.01)
*C10B 57/06*    (2006.01)

(52) U.S. Cl.
CPC .......... *C10B 47/36* (2013.01); *B01J 19/1887* (2013.01); *C10B 47/34* (2013.01); *C10B 53/07* (2013.01); *C10B 57/06* (2013.01)

(58) Field of Classification Search
CPC .......... B01D 1/225; C10B 47/34; C10B 47/36
See application file for complete search history.

(56) References Cited

U.S. PATENT DOCUMENTS 2,546,381 A * 3/1951 Zahm .................... B01D 1/225
                                                159/49
3,067,812 A * 12/1962 Latinen ............. B01D 19/0026
                                                210/179

(Continued)

FOREIGN PATENT DOCUMENTS

EP    1314770 B1    1/2004
GB    1133357 A    11/1968

OTHER PUBLICATIONS

International Search Report and Written Opinion, PCT/US2021/026259 Jul. 16, 2021, 9 pages.

(Continued)

*Primary Examiner* — Jonathan Luke Pilcher
(74) *Attorney, Agent, or Firm* — Eleanor Musick; Torrey Pines Law Group PC

(57) ABSTRACT

An improved reactor vessel for processing (recycling and upcycling) of plastics includes a shear plate assembly disposed on a rotatable shaft concentrically disposed within a cylindrical reactor vessel. The shear plates are spaced from the vessel wall to generate a predetermined strain rate between the shear plate and the inner wall via Couette flow, enhancing efficiency of the reaction.

28 Claims, 12 Drawing Sheets

(56) References Cited

U.S. PATENT DOCUMENTS

| | | | | |
|---|---|---|---|---|
| 3,250,311 A | * | 5/1966 | Thier | B01D 1/225 |
| | | | | 15/246.5 |
| 3,747,899 A | * | 7/1973 | Latinen | B01F 27/60 |
| | | | | 366/310 |
| 4,250,158 A | * | 2/1981 | Solbakken | B29B 17/02 |
| | | | | 201/2.5 |
| 4,321,106 A | * | 3/1982 | Burkhard | B01D 1/225 |
| | | | | 159/13.4 |
| 4,935,171 A | * | 6/1990 | Bracken | B01D 1/225 |
| | | | | 264/4.1 |
| 2009/0173337 A1 | | 7/2009 | Tamaura et al. | |
| 2011/0048006 A1 | * | 3/2011 | Cap | C02F 1/14 |
| | | | | 60/648 |
| 2013/0158309 A1 | * | 6/2013 | Spolzer | C10G 1/02 |
| | | | | 208/100 |
| 2014/0148561 A1 | | 5/2014 | Paul et al. | |
| 2016/0075827 A1 | | 3/2016 | Welch et al. | |
| 2018/0128557 A1 | * | 5/2018 | Peters | F28D 7/1607 |

OTHER PUBLICATIONS

Miandad, R., et al., Catalytic Pyrolysis of Plastic Waste: Moving Toward Pyrolysis Based Refineries, Frontiers in Energy Research, Mar. 2019, vol. 7, Article 27.

Pandey, U., et al., Pyrolysis of Plastic Waste to Environmentally Friendly Products, 2020, WIT Transactions on Ecology and the Environment, vol. 246, pp. 61-73.

* cited by examiner

REACTION VESSEL FOR LIQUID PHASE CATALYTIC PYROLYSIS OF POLYMERS

RELATED APPLICATIONS

This application is a 371 national stage filing of International Application No. PCT/US2021/026259, filed Apr. 7, 2021, which claims the benefit of the priority of U.S. Application No. 63/006,540, filed Apr. 7, 2020, each of which is incorporated herein by reference in its entirety.

FIELD OF THE INVENTION

The present invention relates to a method and apparatus for pyrolysis of polymers with improved economy and energy efficiency.

BACKGROUND

In modern life, plastics are ubiquitous. Plastics are inexpensive, easy to mold, and versatile. Plastic properties have many advantages that make them desirable for commercial applications, however, the adverse effects of plastic waste on the environment, especially marine biota, are becoming increasingly apparent. Wastepaper and plastic, mostly packaging materials, are an environmental and public health problem in developing nations where municipal waste pick-up and land-fill disposal are rare or non-existent. Globally, plastic production was estimated to be 380 million tons in 2018. From 1950 to 2018, plastics of about 6.3 billion tons were produced worldwide, 9% and 12% of which were recycled and incinerated, respectively. It has been suggested by researchers that by 2050, oceans might contain more plastics than fish in terms of weight. Yearly, approximately 500 billion plastic bags are used out of which an estimated 13 million tons ends up in the ocean, killing approximately 100,000 marine lives. Recent studies have reported that microplastics and nanoplastics coming from plastic pollution can be found in nearly every organ of the human body and are suspected of playing a possible role in cancers and neurodegenerative conditions.

Metals, especially aluminum are gathered and recycled because there is a market for them. Unfortunately, recycling of plastics remains a major challenge. There are both technological and economic issues that act to limit the progress in plastics recycling. A slower development within the field of plastics recycling creates a serious problem where millions of metric tons of used polymeric materials are discarded every year around the globe. The fact that the vast majority of used plastics goes to incineration, landfills, or dumps, means that these materials are lost forever as a resource, despite plastics' potential for reuse and recycling. Plastics production requires substantial capital investment and a substantial carbon footprint. Reusing plastics would not only reduce these investment needs but can also contribute to reducing total industrial carbon emissions.

Many common types of thermoplastics such as polyolefins (HDPE, LDPE, LLDPE, PP) and poly-aromatics (PS, EPS) can be easily separated using commercially available density-based separation methods. While mechanical recycling techniques are effective for some of these plastics, it cannot currently handle mixed polymer streams.

Chemical recycling uses a chemical reaction called "pyrolysis" which includes cracking of chemical bonds of thermoplastic polymers to hydrocarbon gaseous and liquid products. Pyrolysis is an important process to handle mixed polymers as well as polymers that have exhausted their potential for further mechanical recycling. The energy required for sustaining a pyrolysis reaction is high due to elevated temperatures in range of 430-550 C and extended reaction residence time. Furthermore, many cracking processes call for the use of hazardous chemicals, which detracts from the intended environmental benefits of recycling.

In addition to the process' high energy consumption, polymer cracking also produces a lot of carbon that can build up on the bottom of the cracking tower, interfering with the mixing and efficiency of the heat exchange. The rate at which larger molecules are cracked is limited by the rate at which they can be brought into physical contact with the catalyst surface. Since the mean free path between molecular collisions is two to three orders of magnitude greater in the vapor than in the liquid phase and higher temperature implies greater thermal kinetic motion, the turbulence found in the fluidized bed of a crude petroleum cracking tower (where very hot catalyst particles are blown together with hot petroleum vapor) is sufficient to sustain a satisfactory reaction rate without resorting to mechanical mixing (rotating paddles, etc.) which is necessary in the liquid phase.

SUMMARY

The present invention is directed to a solution for several of the principal disadvantages of the pyrolysis (cracking) of large organic molecules (aka catalytic de-polymerization or CDP), particularly polymers in a hydrocarbon solvent with the aid of heterogeneous (solid) catalysts. Specifically, the inventive process provides an improved method of supplying heat to the reaction vessels. It also improves the manner by which heat is transmitted into the reactants, increases the efficiency of mixing of the reactants and catalyst and facilitates handling of elemental carbon by-product and un-reactive solids in the feed stock.

According to embodiments of the invention, a "shear plate reactor" is provided comprising a cylindrical barrel with rotating arms that guide "shear plates" or blades close to the reactor wall such that very high shear strain rates are produced. This mixing occurs at the surface where heat needed for endothermic reactions enters the reactor.

In some embodiments, the general configuration and dimensions of shear plate reactors, and the significant enhancement the new shear plate reactor design provides to the efficiency and effectiveness of a multi-reactor facility, makes possible the creation of CDP plants with capacities of 100 tons/day and higher.

In one aspect of the invention, a reactor vessel for liquid phase pyrolysis, includes a cylindrical reactor barrel having a barrel diameter and a barrel length; a heat exchange shell surrounding the reactor barrel, the heat exchange shell connected to a heat exchange circuit and configured to flow a heat exchange fluid over an outer surface of the reactor barrel; a reactor top plate disposed at a top of the reactor barrel; a reactor bottom plate disposed at a bottom of the reactor barrel; a central shaft supported concentrically and rotatably within the reactor barrel; at least one arm set extending radially from the central shaft, each arm having a distal end configured to support a shear plate extending parallel to the central shaft at a spacing from an inner wall of the reactor barrel, the spacing configured to generate a predetermined strain rate between the shear plate and the inner wall via Couette flow; a drive motor supported by the reactor top plate and configured for driving rotation of the central shaft; an inlet for introducing fluid into the reactor barrel for treatment; and at least one outlet for removing processing products from the reactor barrel. Each arm may further support a scraper configured to remove solids deposited on the inner wall, the scraper having a length substantially equal to a length of the shear plate. The at least one arm set comprises a plurality of arm sets spaced apart along a length of the central shaft, and wherein one arm of each of the plurality of arm sets supports a single shear plate having a shear plate length substantially equal to the barrel length. A trailing edge of the shear plate may be curved away from the inner wall to diffuse fluid flow and direct it away from the inner wall. Each arm may include a piston configured to apply variable pressure against the distal end of the arm.

In some embodiments, an electrically-conductive wire may extend through each arm and be electronically connected at distal end to the shear plate and at a proximal end to a conductivity detector, wherein conductance is measured to indicate physical contact between the shear plate and the inner wall.

The heat exchange circuit comprises a molten salt circuit which includes solar concentrators. The predetermined strain rate achieved by the shear plates may be on the order of $10^2$ to $10^3$ per second. The aspect ratio between the barrel length and the barrel diameter is preferably within a range of 5:1 and 10:1. The drive motor is a hydraulic motor configured to drive rotation of the central shaft at 40 to 60 rpm.

In another aspect of the invention, a processing facility includes a plurality of the aforementioned reactor vessels where the reactor vessels are connected in series. Each of the plurality of reactor vessels may be configured to operate at a different processing temperature, where the processing temperatures progressively increase from a first reactor in the series to a final reactor in the series. A plurality of input tanks may be disposed in parallel, each having an outlet in fluid communications with a first reactor vessel, so that material to be processed is pre-processed in alternating input tanks to provide a substantially continuous flow of material into the first reactor vessel.

In still another aspect of the invention, a method for recycling or upcycling of plastics includes mixing a dispersion of particles of plastic, solvent oil and a catalyst to form a slurry; heating the slurry to a processing temperature; and feeding the heated slurry into the aforementioned processing facility to process the slurry.

In yet another aspect of the invention, an improved reactor vessel for liquid phase pyrolysis includes a shear plate assembly disposed on a rotatable shaft concentrically disposed within a cylindrical reactor vessel, the shear plate assembly comprising a shear plate disposed on an arm extending radially from the shaft and parallel to an inner vessel wall surface, the shear plate and arms configured to rotate within the vessel to produce a viscous drag between the inner vessel wall surface and an outer surface of the shear plate. The improved reactor vessel may further comprise a scraper is disposed on a leading edge of the shear plate to remove material deposited on the inner vessel wall surface.

A heat exchange shell may be provided to surround the reactor vessel, where the heat exchange shell is connected to a heat exchange circuit and configured to flow a heat exchange fluid over an outer surface of the reactor vessel. The heat exchange circuit may be a molten salt circuit that includes solar concentrators.

The arms may be a plurality of arm sets spaced apart along a length of the rotatable shaft, so that one arm of each of the plurality of arm sets supports a single shear plate having a shear plate length substantially equal to the length the reactor vessel. The trailing edge of the shear plate may be curved away from the inner vessel wall surface to diffuse fluid flow and direct it away from the inner vessel wall surface. Each arm may include a piston configured to apply variable pressure against a distal end of the arm. In some embodiments, an electrically-conductive wire extends through each arm and electronically connects at distal end to the shear plate and at a proximal end to a conductivity detector, allowing conductance to be measured to indicate physical contact between the shear plate and the inner vessel wall surface.

The viscous drag generated by the shear plates corresponds to a strain rate on the order of $10^2$ to $10^3$ per second. An aspect ratio between a reactor vessel length and a reactor vessel diameter may be within a range of 5:1 and 10:1. A hydraulic motor attached to the shaft is configured to drive rotation of the rotatable shaft at 40 to 60 rpm.

DETAILED DESCRIPTION OF EMBODIMENTS

Figure 1:
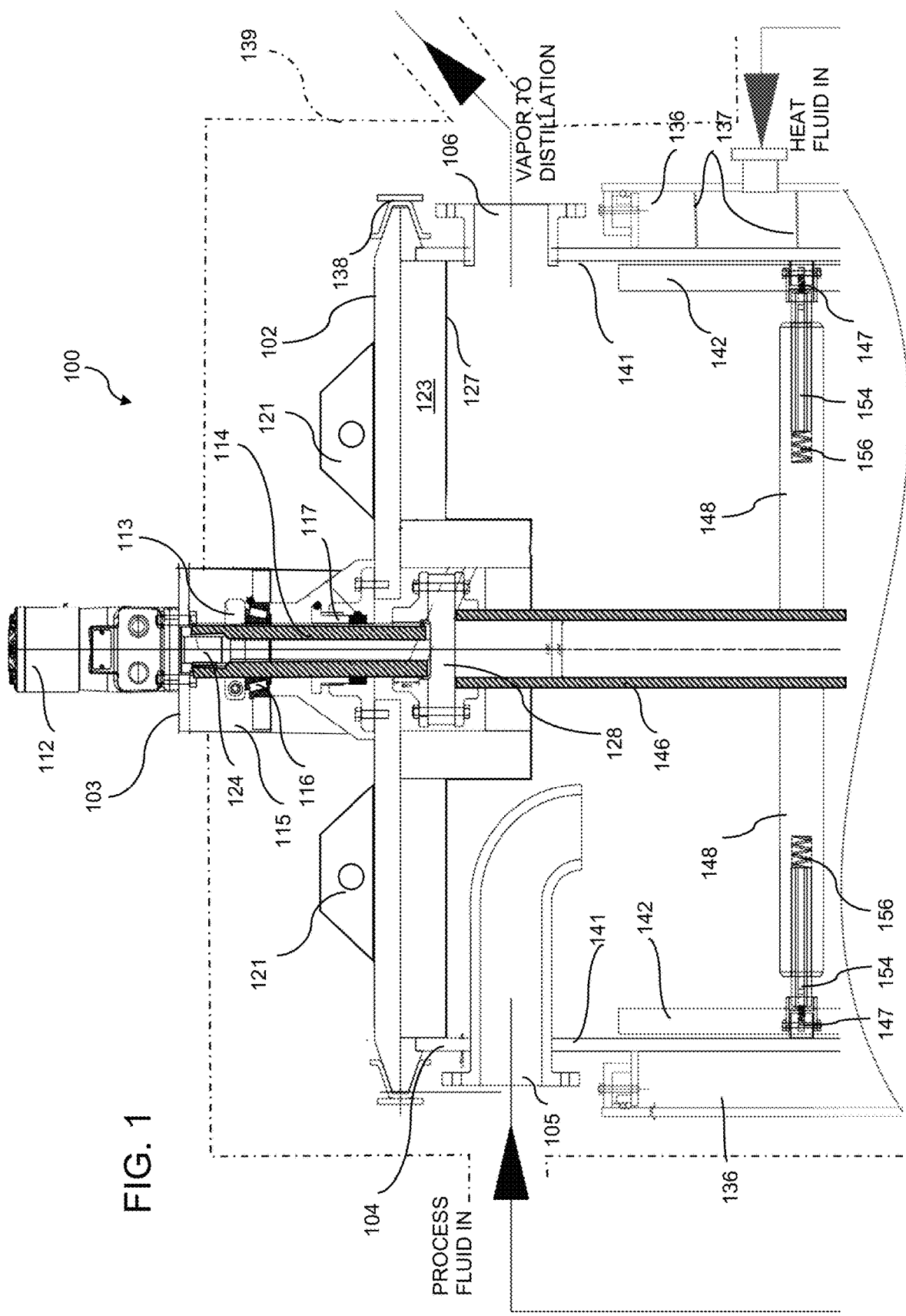
FIG. 1 is a cross-sectional side view of the upper portion of a reactor head assembly according to an embodiment of the invention.

While CDP of plastics and crude petroleum are both pyrolysed (i.e., "cracked") using solid catalysts, petroleum is generally processed as a vapor and at higher temperatures and pressures than are optimum for CDP where a liquid phase is employed to regulate the temperature of the reaction. The improvements disclosed herein are directed to multiple aspects of CDP reaction vessels and processing, each improvement, in itself, representing a significant advancement toward a more efficient and environmentally-sustainable process for plastics recycling.

For heat sources, electrical resistance heat is attractive because it is easily controlled and has been applied directly to a reaction vessels in pilot-scale (approximately 1 to 10 Tons/day) plants and indirectly via a heat exchange fluid in an experimental commercial scale (~100 Tons/day) plant where recovery of gas turbine exhaust heat had been proposed but not attempted in practice.

It has been proposed that mechanical rather than thermal energy can be used to drive the endothermic pyrolysis. Such proposals include the use of impinging jets, high performance (albeit externally heated) mixers, and collapsing cavitation bubbles. U.S. Pat. No. 7,473,348 of C. Koch describes application of electric heat to the walls of the reaction vessels with the additional energy being supplied mechanically through impingement of a high velocity jet upon the counter flowing circulation of a hydro cyclone. A heat exchanger external to a stirred reaction vessel is described in U.S. Pat. No. 9,371,492 of Spitzauer, et al.

Although electrical resistance heating has been used to supply most of the energy and mechanical (viscous dissipative) heating claimed to provide some additional energy input for pilot-scale testing of CDP, it is generally not economically viable to use these methods on a commercial scale operation because three to five times as much thermal energy must be expended to supply the electric energy required for resistance heat or an electric motor than to apply the thermal energy directly.

While conversion of electrical energy and shaft work to heat is 100% efficient, conversion of heat to work is limited to some fraction (usually less than half) of Carnot's ΔT/T. The product of this heat to work efficiency together with, electric generation, transmission and motor efficiencies results in an overall efficiency on the order of 20-30%.

The thermal energy required to raise the temperature of a polymer, e.g., polyethylene, from ambient (20° C.) to the boiling point of diesel (390° C.)

$$C_p \Delta T \sim \left(2.2 \frac{kJ}{kgK}\right)(390-20)K = 814 \frac{kJ}{kg},$$

whereas the energy that must be supplied to cause the endothermic pyrolysis of polyethylene to diesel given the enthalpy of formation of each (from PropEP checked with NIST) is:

$$H_{pyr} = H_{f,PE} - H_{f,D} = -1.99 - (-2.05) = 58.6 \frac{kJ}{kg}$$

so that more than fourteen times as much energy goes to raising the reactant's temperature than to drive the pyrolysis. (Note that the US Navy's Propellent Evaluation Program (PropEP) database values were used for $H_{f,PE}$ and $H_{f,D}$ which give larger $H_{pyr}$ than NIST. (NIST has $H_f$ for Cetaine $C_{16}H_{34}$ but not diesel).)

In a CDP reactor, many products of increasing molecular mass and vapor pressure will emerge from the process mixture as it is heated to its final temperature just above the diesel boiling range. The argument about $C_p \Delta T \gg H_{pyr}$ holds for all products, and when the heats of solution and vaporization are added to the integrated heat capacities, it is evident that electric or mechanical work are not viable energy input mechanisms for large scale pyrolysis reactors.

A CDP reactor needs to operate just beyond the diesel boiling range of 390° C. and a useful heat transfer fluid must be stable at least 20-30° C. higher than this in order to avoid the economic burden of too large heat exchange surface areas and too high fluid pumping rates.

Mixtures of Biphenyl and Diphenyl Oxide (BDOM) are perhaps the most thermally resistant organic heat transfer fluid available. One such mixture, Eastman VP-1®, has been used as a heat transfer fluid between electric heaters and heat exchange with the CDP process fluid. (See, e.g., U.S. Pat. No. 9,371,492.)

The maximum operating temperature of Eastman Thermotrol® 75 is 385° C. while Eastman VP-1 has a slightly higher maximum operating temperature (400° C.) its vapor pressure must be regulated at 10 Bar to remain a liquid at 390° C. While the heat of vaporization of a boiling BDOM is an excellent way to control the temperature of exothermic reactions, it is not suitable as a heat exchange fluid between endothermic pyrolysis that needs to operate near VP-1's $T_{max}$ and a heat source such as concentrated solar at least 150° C. greater than $T_{max}$, turbine or reciprocating engine exhausts ~500° C.>$T_{max}$, or even hydrocarbon/air flame at ~1000° C.>$T_{max}$.

Excursions above set-point temperature in heat transfer circuits can occur due to leaks, failure of valves, pumps, operator error, controller overshoot response to transients, etc. With BDOM boiling liquid and vapor, increased temperature results in increased pressure unless the vapor is cooled by expansion or by heat exchanger/condensers, or preferably both.

Since leakage or venting of a BDOM to ambient results in a flammable or explosive fog, using them requires a large overpressure safety factor above the 10 Bar operating pressure (vs. ambient pressure plus a modest SF of the CDP process), as well as large expansion tanks and condensers. The commercial-scale test plant described in U.S. Pat. No. 9,371,492 used large VP-1 expansion tanks with a back-up relief vent to ambient.

Reactants must be brought up to a temperature at which pyrolysis can take place after which a continuous supply of energy must occur to maintain the reaction temperature to promote the mildly endothermic decomposition of polymers into smaller molecules that are useful particularly for transport fuel. Hydrocarbons in general, especially hydrocarbon and polysaccharide polymers, as well as heat exchange oil solvents that can resist decomposition at the high reactor temperatures (up to around 400° C.) have low thermal conductivity, low diffusivity ($\alpha = k/\rho C_p$), and high viscosity, which impede convective and advective heat exchange.

In U.S. Pat. No. 9,371,492, a heat exchanger external to a stirred reaction vessel were employed with electrically heated VP-1 circulated in the shell side. The process fluid circulated in the heat exchanged tubes, where fouling and plugging were anticipated and experienced in a commercial-scale test plant.

The reactant polymers need to be brought into proximity of the solid catalyst surfaces by vigorous mixing. The relatively high viscosity of thermally stable hydrocarbon-based solvents as well as the reactant polymers increases the mechanical work to accomplish the necessary mixing.

Various prior art teachings include that energy to drive the endothermic pyrolysis should come from impinging jets, collapsing cavitation bubbles, and special mixers, such as described in US Patent Publication No. 2008/0116116 of Koch.

Carbon build-up on heated reaction vessel surfaces and in heat exchanger flow passages has historically been a process problem. Catalyst that has become inactive due to a coating of carbon, i.e., "spent" catalyst, and solid byproducts, mostly elemental carbon at about 10% of the feed mass, must be removed for further treatment or disposal.

In patent publications WO2008/061484 and US2008/0116116 of Koch, each incorporated herein by reference, solids (carbon plus unreactable material) are separated by gravity. A subsequent patent, U.S. Pat. No. 7,473,348, also of Koch, removes carbon build-up on process vessel walls with scrapers and from the process fluid with a hydro cyclone. Spent catalyst, along with other un-reacted solids, are heated to 550° C. to burn off the coke so that the catalyst can be returned to the process, as is generally done with petroleum gas-phase cracking.

According to the inventive approach, shear plates used together with conventional scraper blades are highly effective in addressing the problems arising from each of: 1) slow heat exchange into an oily (viscous, low thermal conductive) liquid; 2) incomplete and slow mixing of reactants with catalysts; and 3) fouling of heat exchanger and reactor surfaces with byproduct carbon. Furthermore, while the physics of reaction energy supplied via mixing work is sound, the economics on a commercial scale is not.

Cylindrical reactors with rotating scrapers share this feature with scraped surface heat exchangers (SSHE) but differ from SSHE in their use of shear plates to efficiently produce very high strain rates comparable to small, high-speed blade or paddle impellers such as are found in continuous stirred tank reactors. The shear plates do not actually scrape when performing their intended function.

The Couette flows created by the shear plate reactor disclosed herein differ from those found in Taylor-Couette reactors that have relatively widely-spaced concentric cylinders that generate multiple vortex cells known as "Taylor cells". The inventive shear plate reactor design employs discrete blades that run very close to the reactor wall to produce the desired high strain rate.

Figure 9:
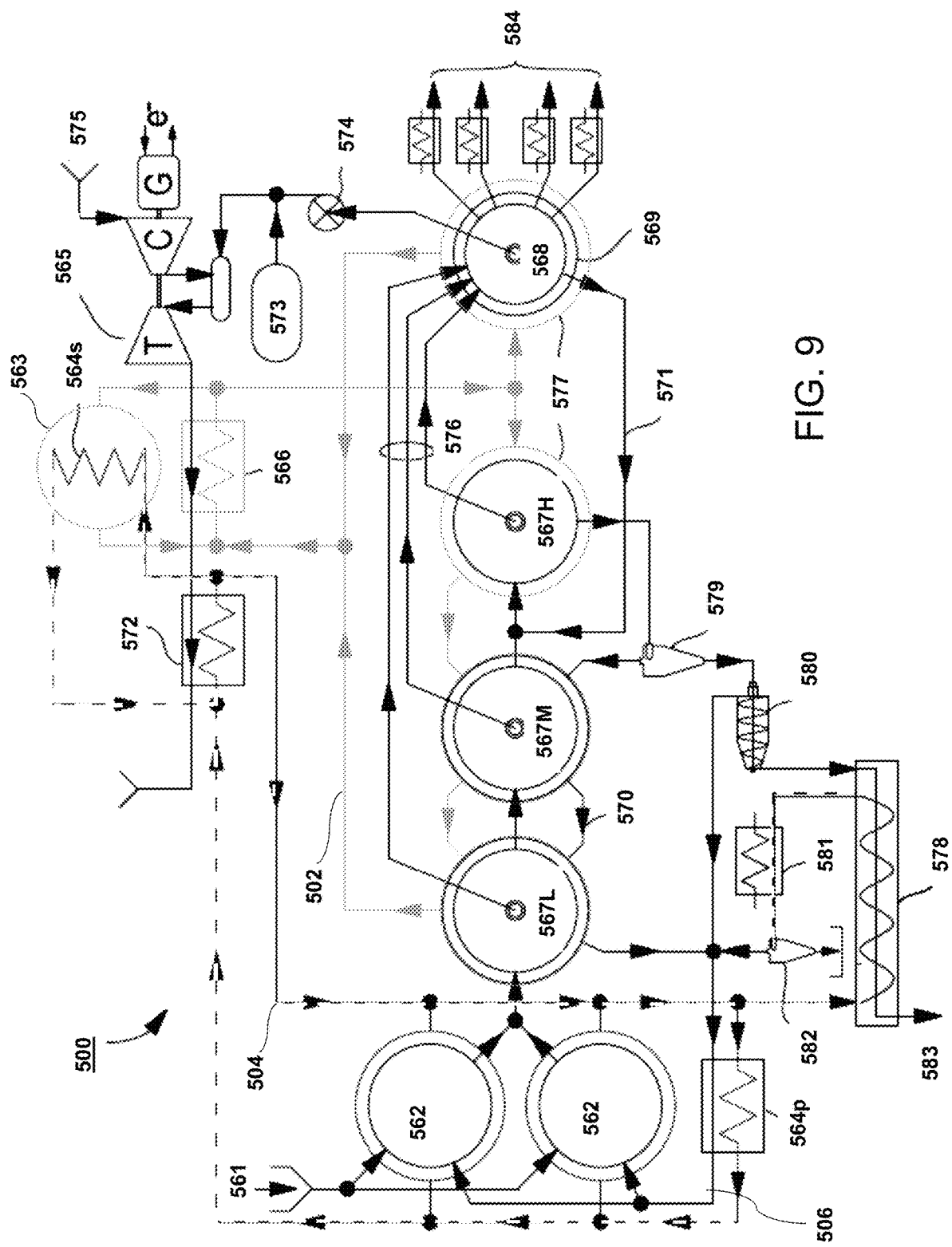
FIG. 9 is an exemplary plant schematic incorporating a plurality of reactors according to an embodiment of the invention.
Figure 10:
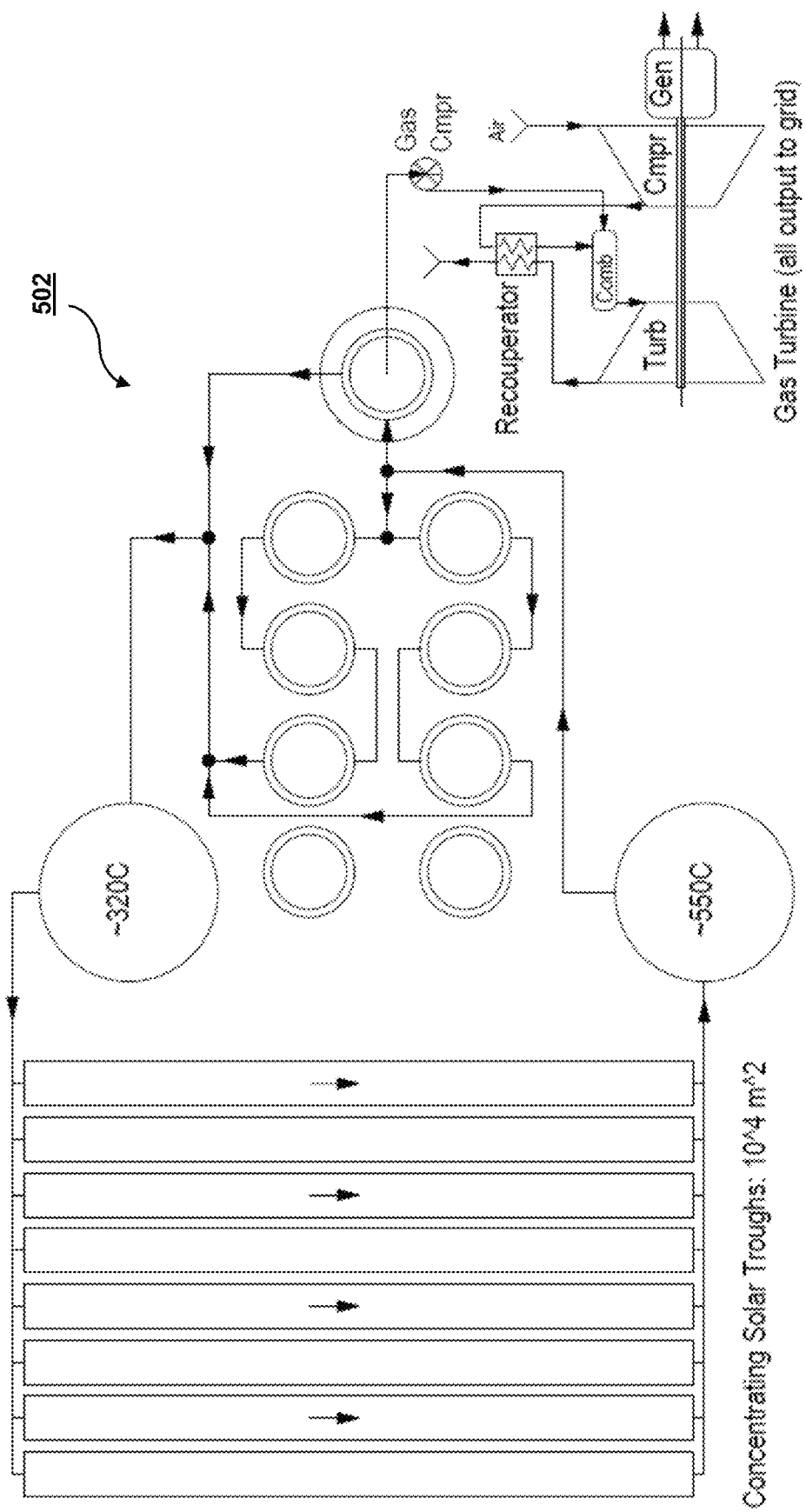
FIG. 10 is a schematic of a molten salt circuit for use in a conversion plant according to an embodiment of the invention.

Temperatures reached by concentrated solar power (CSP) with tracking trough collectors fulfill the requirements of the CDP process. The portion of a CSP array's thermal output invested in CDP results in a form of long-term storable energy that compliments the CSP's shorter duration thermal energy storage. FIG. 10 provides a schematic of an exemplary CSP-heated molten salt circuit 502 for a plastic conversion plant. (See, e.g., salt circuit 502 shown in FIG. 9.)

It would be particularly desirable to be able to run a heat engine, such as an Ericsson, Brayton, Diesel, Stirling, Otto, Rankin (in order of preference) on the less valuable overhead gasses and less easily-stored distillate fractions, and to utilize the engine's waste heat for the catalytic pyrolysis process. Electric power produced by an engine is best used for the "hotel load"-system components not related to the main power demand of heating, such as pumps, mixers, actuators, controls, etc., with any excess power being sold off-site rather than being used for heating pyrolysis reaction vessels.

Nitrate molten salt, sometimes referred to as "solar salt" (60% $NaNO_3$, 40% $KNO_3$) used in CSP plants, is a good candidate for use as a heat transfer fluid for the CDP process, regardless of whether solar energy is the primary heat source. Molten salts can operate up to 550° C. and do so at ambient pressure. A leak simply solidifies rather than forming an explosive fog like organic heat transfer fluids do. On start-up, provision must be made to bring the process fluid up above the salt melting point (~250° C. for solar salt, but heat treat salts have a melting point as low as 135° C.) in an auxiliary heat exchanger with electric, gas fired, or engine exhaust heat.

Reaction chamber configuration: Cylindrical (304L SS) reaction vessels have high axial ratios (length/diam from 5:1 to approximately 10:1), so that a reasonable surface to volume ratio is maintained for heat exchange through the walls of the vessels. The maximum diameter is about one meter, but somewhat smaller diameters fall within the range of standard welded tubes for better economy of construction and have better heat exchange surface/volume ratios.

A rough mass build-up for a reactor with an inner diameter (ID) of 0.761 m and a length of 5 m with an estimated specific gravity of 1.30 [g/cm3] is provided in Table 1 below.

TABLE 1

| OD [in] | Wall [in] | Len [in] | Specific gravity | Mass [lbm] | |
|---|---|---|---|---|---|
| 30.0 | 14.00 | 177.17 | 1.30 | 5852.76 | Process fluid charge |
| 34.0 | 2.00 | 196.85 | 2.20 | 3144.34 | Solar salt hx fluid |
| 30.0 | 0.50 | 196.85 | 7.85 | 2585.76 | Reactor barrel |
| 32.0 | 15.00 | 2.00 | 7.85 | 454.18 | Reactor ends |
| 34.0 | 0.12 | 196.85 | 7.85 | 742.31 | Heat exchange shell |
| 38.0 | 2.00 | 196.85 | 0.20 | 321.58 | Insulation |
| 38.0 | 0.03 | 196.85 | 7.85 | 166.43 | Insulation cover |
| 3.0 | 0.38 | 98.43 | 7.85 | 86.28 | Upper scraper shaft |
| 3.0 | 0.19 | 98.43 | 7.85 | 46.22 | Lower scraper shaft |

In Table 1, if typical expected solvent and reactant densities and mass fractions are chosen, the reactor mass build-up would be:

TABLE 2

| Component | mass [Ton] |
|---|---|
| Reactant | 1.19 |
| Solvent | 1.46 |
| HX Salt | 1.43 |
| Structure | 2.30 |
| Total mass | 6.08 |

This is an appropriate size and mass for economical fabrication, transport, in-plant installation and replacement or maintenance in an industrial scale facility.

A cross-section of an exemplary reactor head assembly 100 according to an embodiment of the invention is shown in FIG. 1. Components are designed for economy of fabrication, maintenance and operation at high temperature. Reactor plate 102 sits on top of cylindrical reaction vessel 104 providing support for drive motor 112, which rotates shaft 146 within the vessel. Reactor plate 102 may be attached and sealed to the upper plate of vessel 104 by a clamp 138, such as a Marman clamp to take advantage of their strength and ease of attachment and removal. Alternatively, a bolt ring may be used. Motor 112, which will typically be a low speed, high torque hydraulic motor (e.g., Eaton H-series Shar-Lynn), is mounted on reactor plate top 103 and connected to upper shaft clamp 124 via a Woodruff key. Upper shaft 114 is enclosed within welded steel frame 115, which is bolted to top plate 103. Shaft 114 is guided by one or more bearing 116, which may be a tapered roller bearing or thrust bearing such as a Glacier-Garlock CBM self-lubricated sintered graphite-bronze. Upper shaft 114 is connected via flange 128 to central shaft 146. Flange 128 and shaft 114 are insulated by a disk of high density ceramic fiber board or mica from central shaft 146. The reactor top plate and drive components attached to it are also insulated by a 50 mm (2") layer of closed-cell ceramic foam insulation 123, which is supported and shielded by 20 gauge stainless steel sheets 127. All heated components have at least 50 mm-75 mm (2"-3") of heat-stable insulation (T-glass or equivalent) on their outer surfaces, generally indicated by dashed line 139. Four lugs 121, arranged radially around reactor plate 102 at 90° spacings allow for removal and replacement of the drive head and shear plate assemblies, lifting of the entire reactor, and/or attachment of sway bracing when reactors are in operation.

Fluid to be processed is introduced into vessel 104 through inlet port 105. Vapor exits the vessel at exit port 106. Inlet 105 and exit 106 are located in the barrel of reactor vessel 104 to facilitate removal of the head and shear plate assemblies. Additional components of the reactor head assembly are shown in the figure but are not separately labelled. These components include seals, glands, bearings, clamps, fasteners, insulation, and other components that are commonly used in such systems. Identification and selection of such components will be within the level of skill in the art and are not described herein.

Heat exchange shell 136 may be formed from steel, preferably stainless steel, tubes having a radius that is about 5 cm (2") larger than the outer diameter of the reaction vessel to provide passages for heat transfer fluid. To minimize differential thermal expansion between the shell and the reactor wall, shell 136 is preferably made of the same alloy as the reactor vessel 104 (304L). Heat exchange shell 136 is disposed concentrically around cylindrical reaction vessel 140 and bolted via welded flanges to annular flanges on the reactor barrel to provide passages for heat transfer fluid. Steel baffles 137 are brazed to the outer surface of the cylindrical reaction vessel 104 with 45° gaps on alternate sides to guide heat transfer fluid, e.g., solar salt fluid, to all areas of the outer reactor cylinder wall. All heated components have at least 50 mm-75 mm (2"-3") of heat-stable insulation on their outer surfaces.

Extending radially from central shaft 146 are multiple sets of arms 148. Central shaft 146 is driven by motor 112, causing it to rotate the one or more sets of blades at about 40 to 60 rpm that perform multiple functions. In the illustrated examples, the blade assembly includes a pair of blades supported on arms 148 that are arranged 180° apart on shaft 146. As will be apparent to those in the art, additional arms and blades may be employed, for example, three blades separated by 120°, or four blades separated by 90°. Accordingly, the two blade arrangement is provided as an illustrative example.

Figure 2:
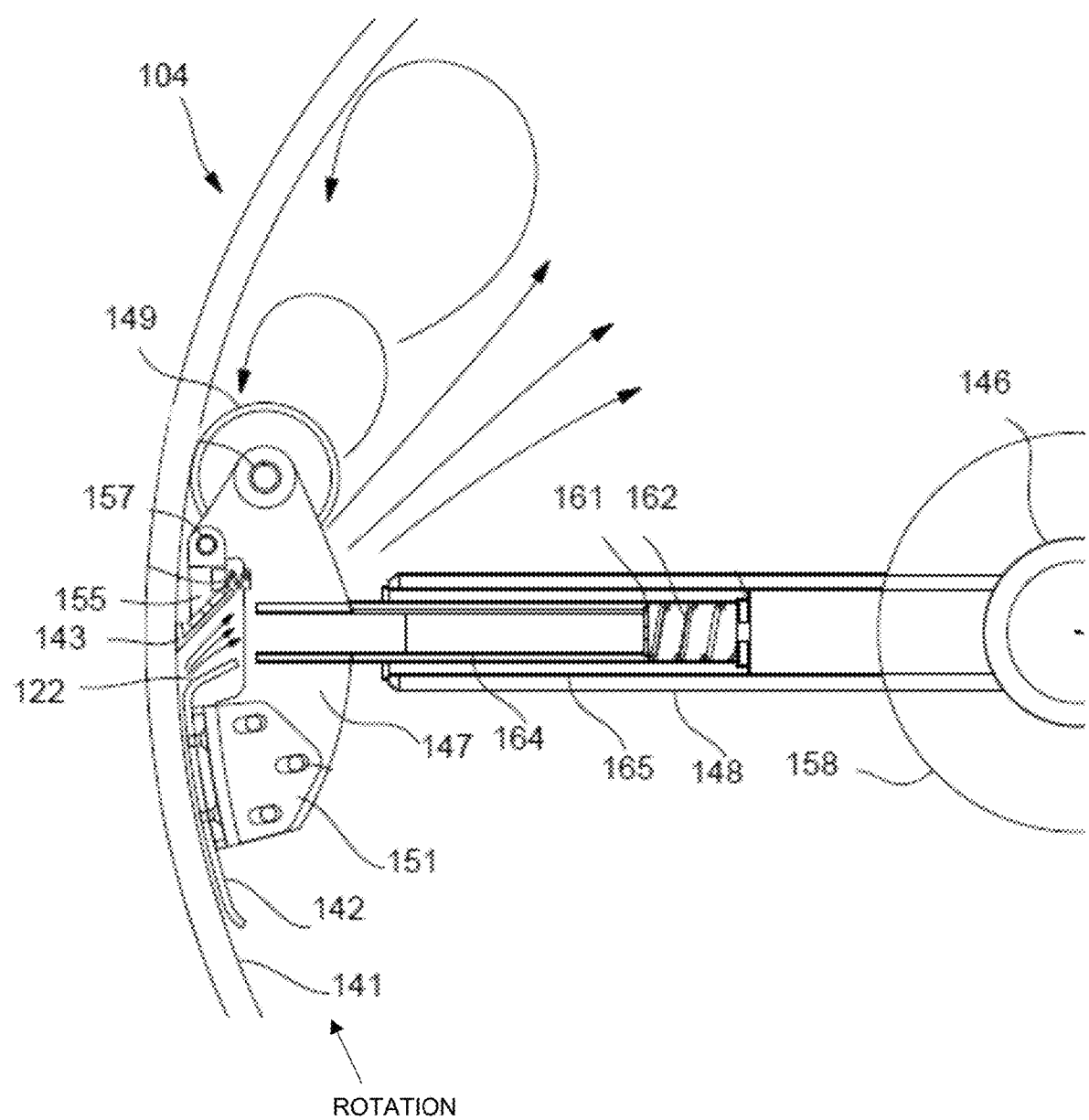
FIG. 2 is a diagrammatic top view of a shear plate arm within the interior of a reactor head assembly according to an embodiment of the invention.

Referring to FIG. 2, the key elements of each blade are a shear plate 142 and a scraper 143, which removes carbon (coke. ash) that deposits mostly on the heat transfer surface 141. Stainless steel shear plate 142, which is about 5 mm (³⁄₁₆") thick, is supported so that its surface is substantially parallel to and spaced on the order of 2 to 3 mm away from the reactor vessel wall 141 so that a strain rate on the order of $10^2$ to $10^3$ per second is maintained by the Couette flow between shear plate 142 and wall 141. As shown, process fluid flow is diffused by the aft edge of shear plate 142 and scraper 143, deflected away from the wall 141 and eddy aft of the shear plate assembly.

The leading edge of scraper blade 143 deflects the process fluid, both newly reacted and as-yet unreacted material) away from reactor wall 141 and toward the central part of the cylindrical reaction vessel while the eddy downstream of the scraper blade advects process fluid from the bulk back toward the heated reactor wall 141, thus increasing the overall heat exchange rate. Trailing edge 122 of shear plate 142 is curved away from the reactor wall 141 to stiffen the shear plate assembly, to diffuse the flow and, together with the leading portion of the scraper blade 143, direct it away from the reactor wall, taking advantage of a small thrust in the direction of blade motion resulting from the volume increase upon pyrolysis and evolution of vapor.

Shear plate arms 148 are welded to central shaft 146 and the joint may be reinforced with an annular gusset 158. Within each arm, piston 164 moves radially within bronze bushing 165. The distal end of piston 164 is welded to frame 147, which carries the axle for wheels 149 (2 per arm). Bracket 151 attaches to frame 147 via three bolts to allow adjustment. Wheels 149 may be bronze-bushed or simply bronze. Scraper 143 is mounted on scrapper arm 155, which is attached to frame 147 via axle 157.

Piston 164 is biased outward by spring 162 in chamber 161. The combination of wheels 149 and piston 164 allow the shear plate 142 to follow small out of round deviations of the reactor barrel or acentric location of the shaft 146.

Figure 3A:
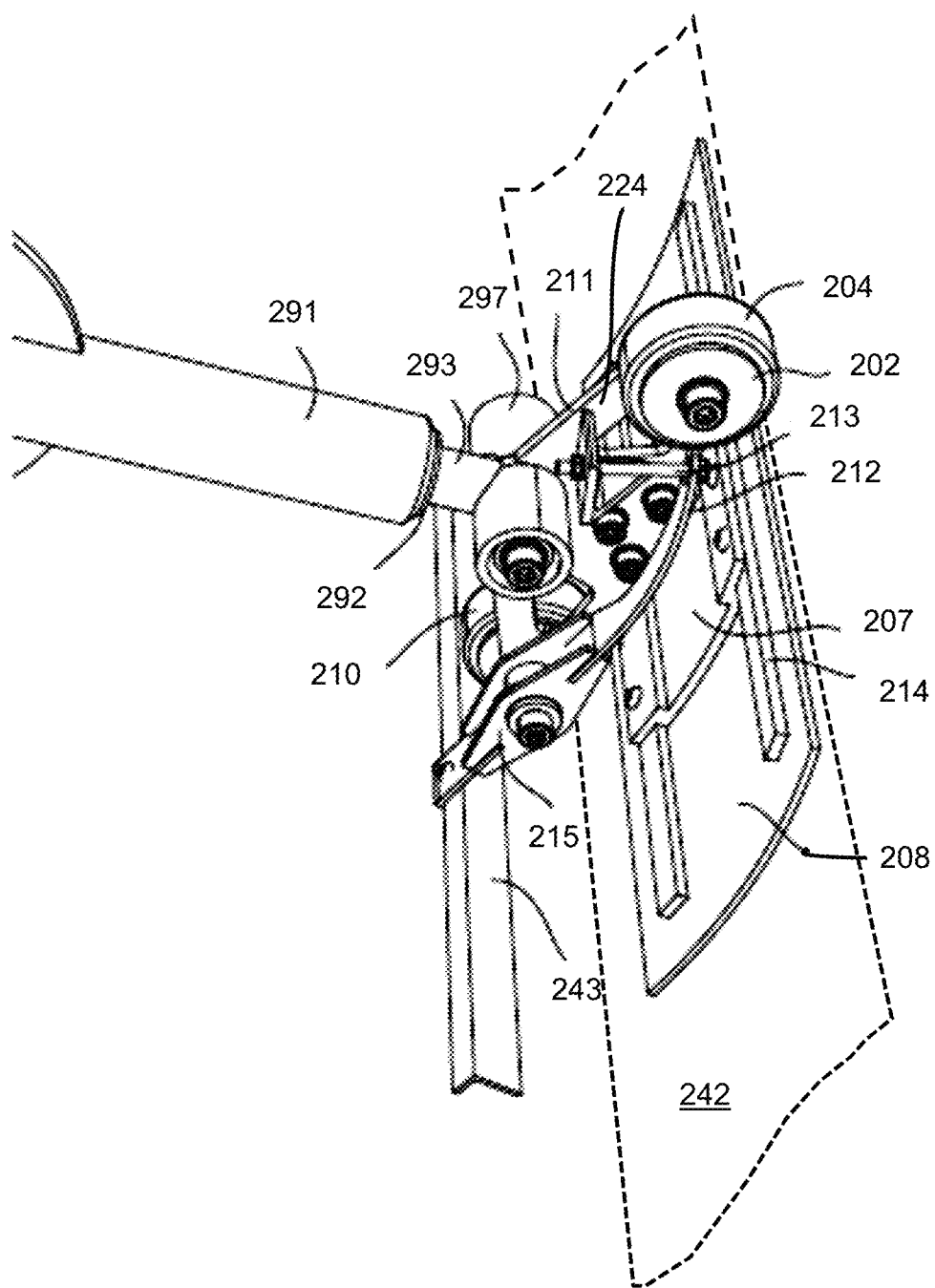
FIGS. 3A and 3B are perspective and exploded views, respectively, of a shear plate arm assembly according to an embodiment of the invention.
Figure 3B:
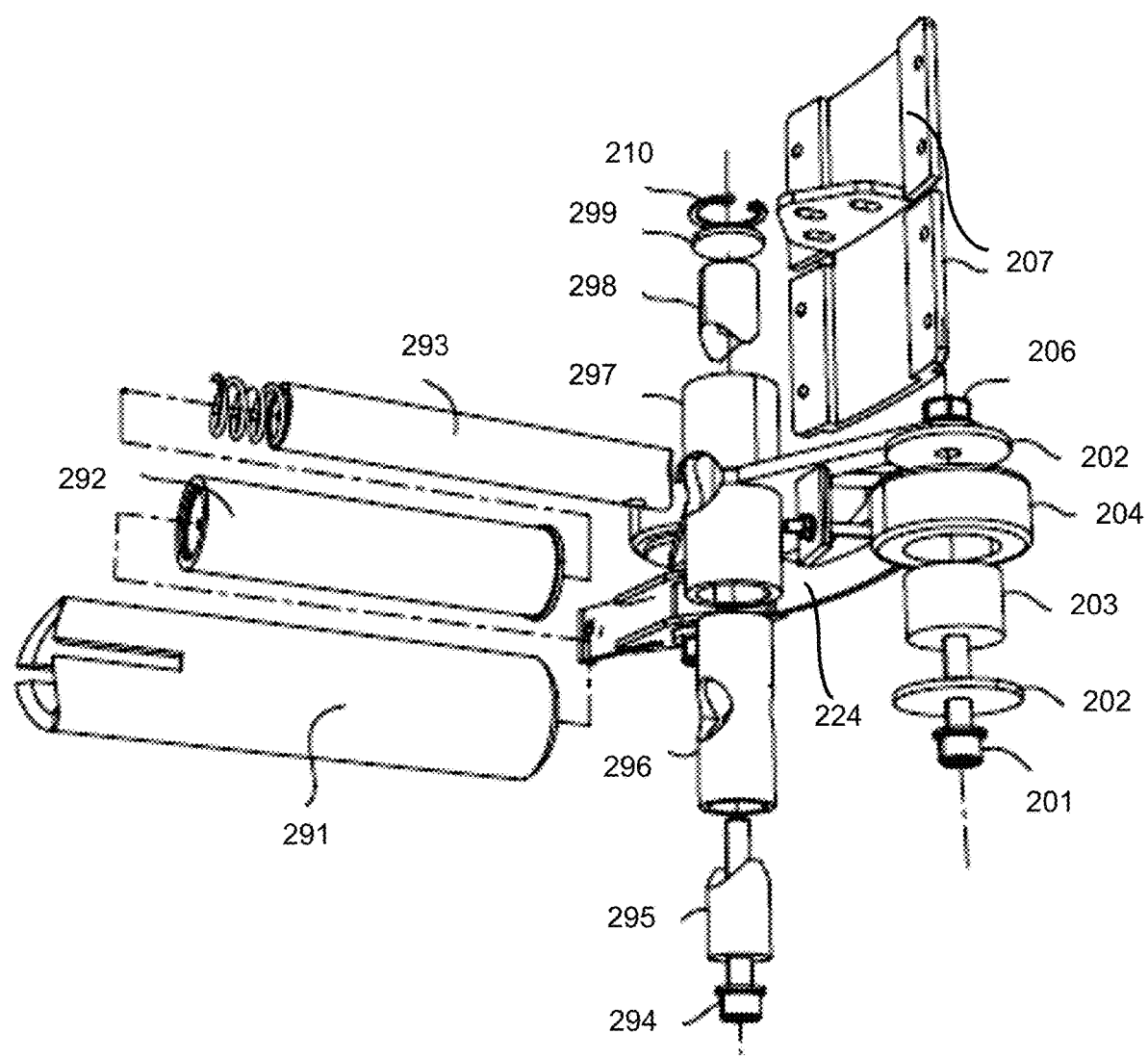

FIGS. 3A and 3B illustrate an embodiment of the shear plate arm with a more robust "truck" assembly than the design shown in FIG. 2. This configuration provides increased support for the shear plate 242 and scraper 243 through the addition of a leading wheel 204, so that two wheels 204 and 210 straddle shear plate 242. In order to tolerate greater asymmetry between the central shaft and reactor barrel, a bronze wrist bearing 296 is fitted inside wrist bearing housing 297 that is welded to frame 224. The wrist pin includes two halves: the first half 295 has a center bore for receiving bolt 294, while the other wrist pin half 298 is threaded for the bolt that clamps the two wrist pin halves to piston 293. Piston 293, which is spring biased, slides within bronze bushing 292 within arm 291.

Trailing wheel 210 and leading wheel 204 each run on bronze bushings 203 and are retained axially by large thrust washers 202. Wheel bushing 203 and thrust washers 202 are clamped to frame 224 by bolt 201 and nut 206. The weight of the shear plate 242, scraper 243, and the truck itself is borne by the bronze thrust bearing 299 that is retained in the upper end of wrist bushing housing 297 with a circlip 210.

In an exemplary 5 meter long reactor, a 5 meter long shear plate 242 will typically be supported along its length by five arms. (See, e.g., FIGS. 5A and 5B.) In order for each of the five trucks to bear equal parts of the shear plate's weight, reinforcing bars 214 are provided, tapped for machine screws and tightened to hold the bars to shoe plates 207, which, in turn are attached to frame 224. The shear plates, or segments that make up the shear plates, are then welded to the reinforcing bars 214 as the last step of the assembly.

Scraper 243 is retained on a scraper arm and spring assembly 215, which extends from a spring 212 formed from a heat resistant alloy, to provide an opposing force on the scraper. The scraper arm pivot is provided with a bronze bushing. This scraper assembly is secured with the same nut and bolt that clamps the trailing wheel 210 to frame 224. A spring force adjustment bolt 213 reacts via a small bracket welded to the frame.

Figure 4A:
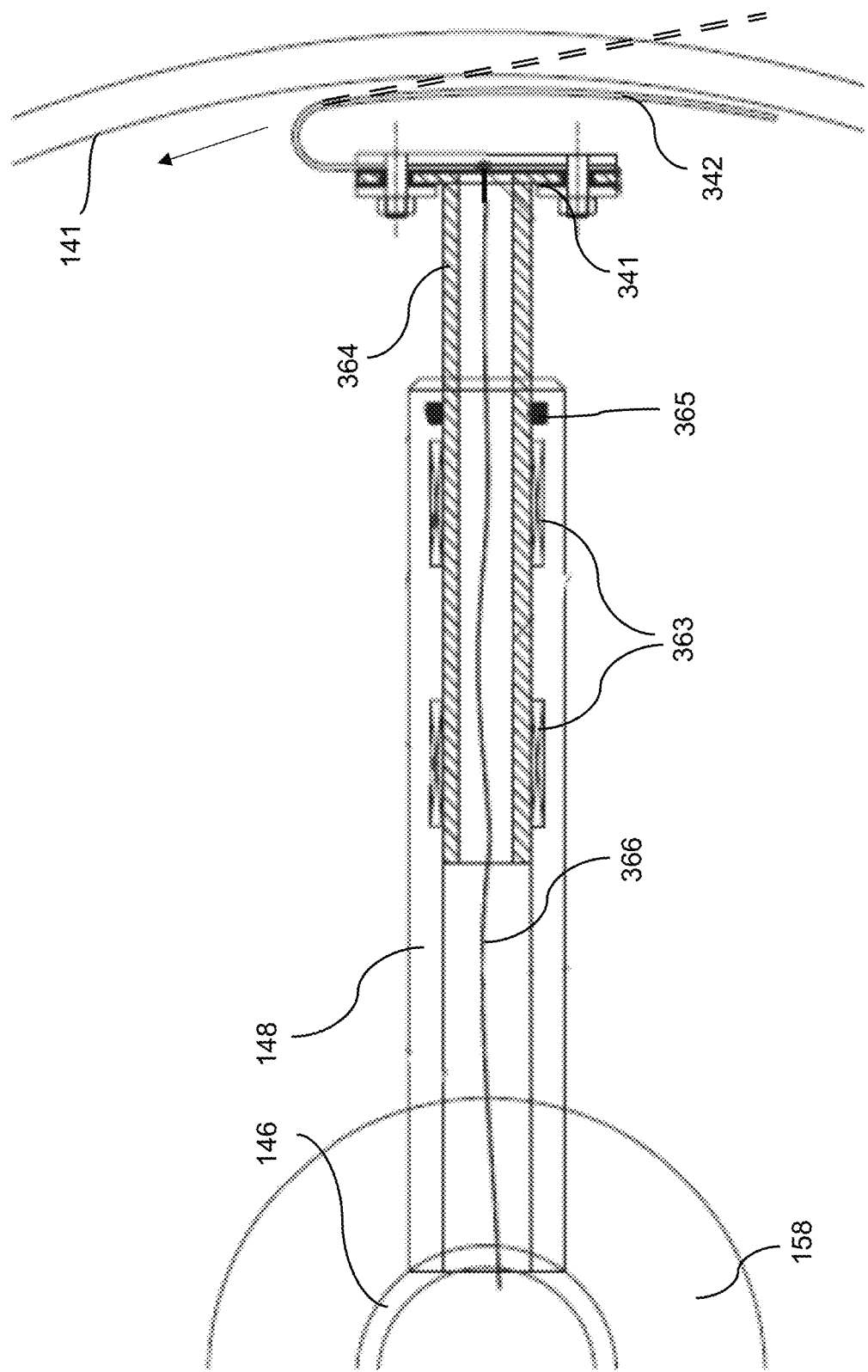
FIGS. 4A and 4B are partial cross-sectional top views of embodiments of a shear plate arm with a shear blade.
Figure 4B:
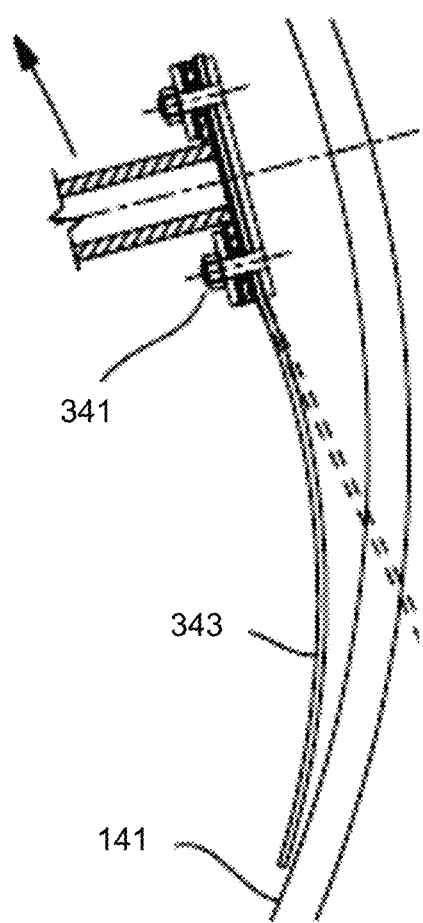

FIGS. 4A and 4B illustrate additional embodiments of the shear plate assembly that employ flexible shear blades 342, 343 attached to the distal end of piston 364 by bracket 341. Shear blades 342, 343 are made from allows such as INCONEL®, an austenitic nickel-chromium-based superalloy. The undeflected/free shape of the blades are shown as dashed lines.

Adjustable force is applied via piston 364 to the shear blades by hydraulic pressure using clean turbine oil, i.e., the process solvent, that is conducted up the drive shaft 46 from a hydraulic swivel just below the lower shaft bearing. Piston 364 moves inside GGB-CBM graphite/bronze bearings 363 and employs a Graphoil seal 365. Blade clamp 341 is electrically common with the shear blades, with insulation isolating the blade from the piston 364. The center of piston 364 is filled with furnace cement to seal it and guide and protect the continuity sensing wire 366. Wire 366 is bonded to blade 342 and in electrical communication to an ohm meter allows electrical conductance measurement to be used to indicate physical contact between the shear blade and 141 wall. Hydraulic pressure against piston 364 is adjusted until the blade 342, 343 hydroplanes on a surface layer in which a high strain rate is present. At high hydraulic pressure and low or nil rotation speed, carbon build-up that forms a semi-conductive path between the blade 342, 343 and wall 141 can be detected. If a dedicated scraper is not installed, the shear blades 342, 343 can be employed to scrape carbon from the wall by reversing the direction of rotation for a few revolutions until conductivity is reduced to indicate the absence of a carbon layer.

Figure 5A:
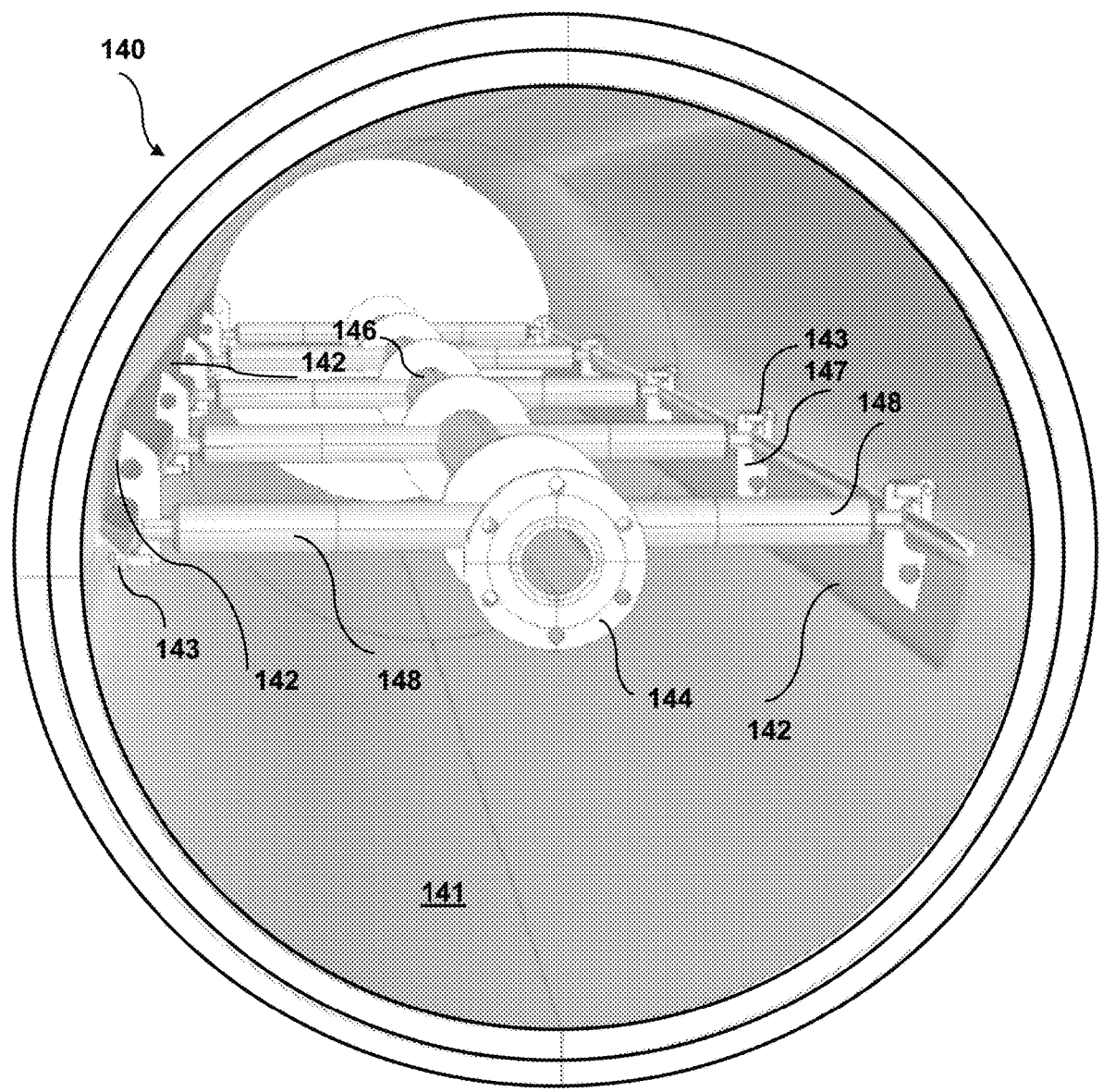
FIGS. 5A and 5B are a diagrammatic perspective views of the interior of a cylindrical reaction vessel showing the shear plates and scrapers according to an embodiment of the invention.
Figure 5B:
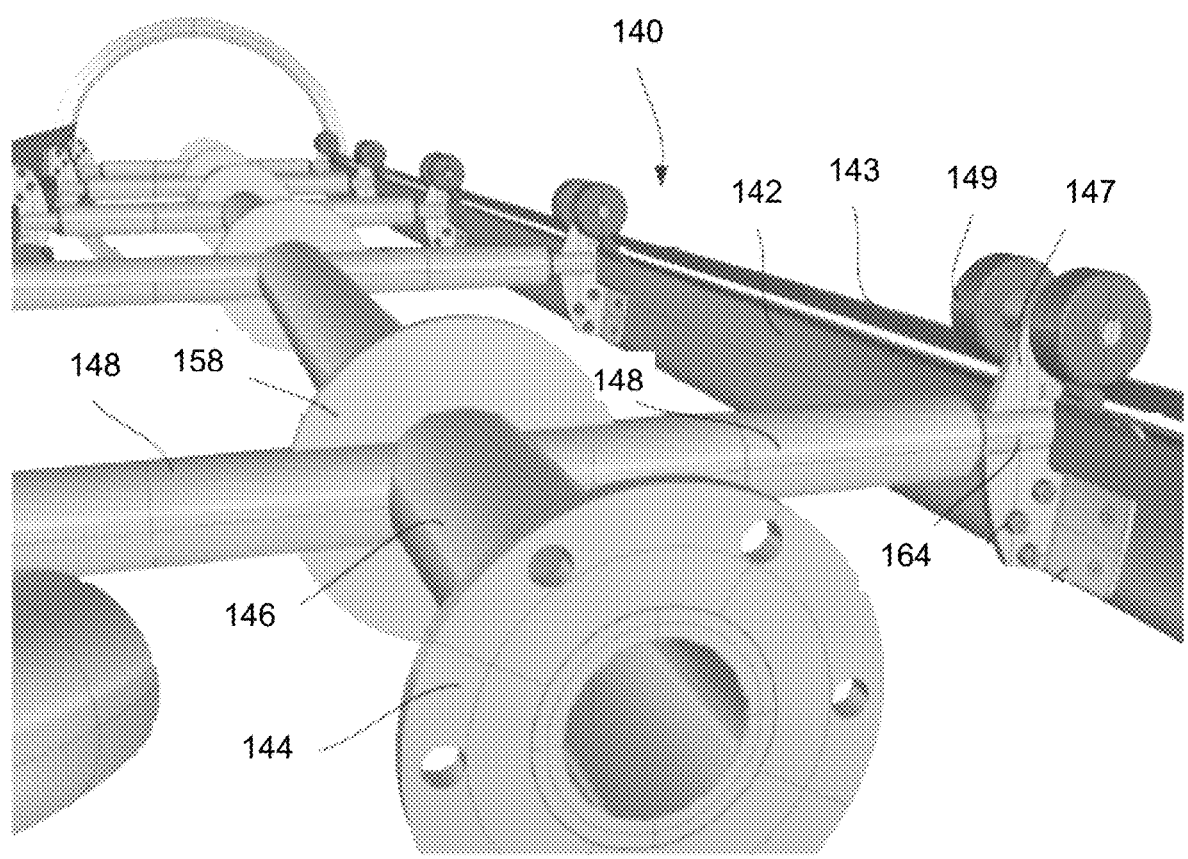

FIGS. 5A and 5B illustrate views down a cylindrical reaction vessel 140 of slightly different implementations of the shear plate assembly of FIG. 2. As illustrated, a six-bolt flange 144 is welded to the central shaft 146 with five sets of arms 148 supporting shear-plates 142 and scrapers 143. Other than slight variations in the construction of frame 147 and wheels 149, the assemblies are essentially identical.

Figure 6:
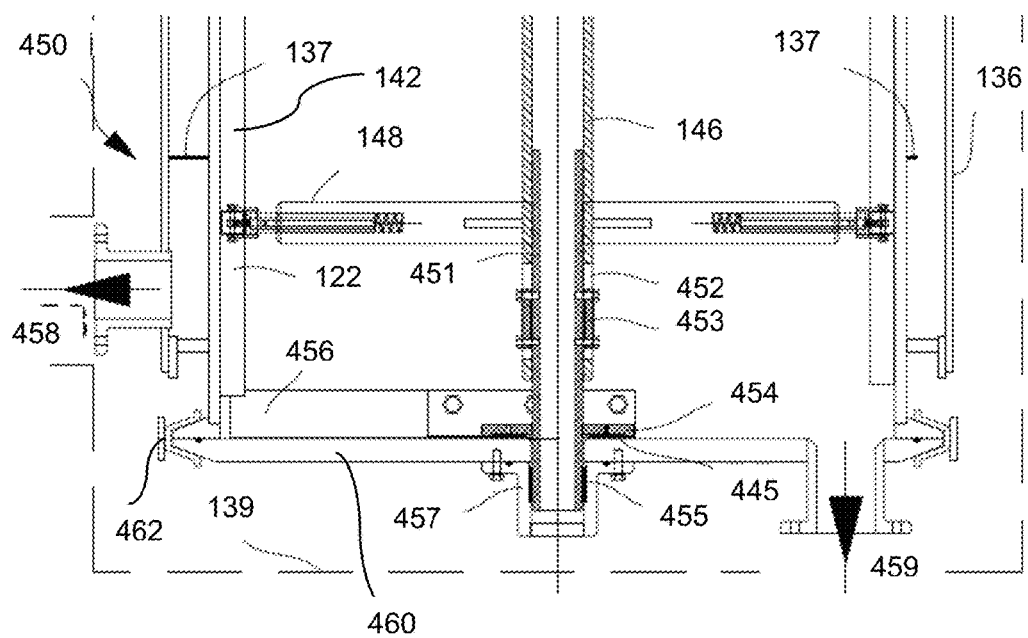
FIG. 6 is a cross-sectional view of the bottom of a reactor vessel according to an embodiment of the invention.

FIG. 6 is a cross-section the bottom portion of an embodiment of a reactor vessel showing how the shear plate drive shaft 146 is coupled to the bottom scraper shaft 451 by a simple spline which includes two spline teeth 453 bolted to the scraper shaft 451. The teeth 453 move vertically in slots 452 milled in drive shaft 146, allowing the bottom scraper assembly to be withdrawn upward through the top of the reactor vessel. The overlap between the two shafts 146 and 451 of at least five diameters ensures that the shafts are concentric and that axial bearing 455 can maintain concentricity of the lower end of the shear plate assembly. Axial shaft bearing 455 is retained within bottom cap 457 which is bolted to reactor vessel bottom plate 460. Bottom plate 460 is attached to the lower end of the reactor vessel via Marman clamp 462. Solid materials are swept by bottom scrapers 456 to outlet 459.

Thrust bearing 445, which is attached via screws to the bottom of plate 454, bears the weight of the bottom scraper assembly and maintains the bottom scrapers 456 in light contact with the upper surface of bottom plate 460. The heat exchanger shell fitting 458 provides the outlet from heat exchanger shell 136 for counter-flowing primary heat transfer fluid. As previously described, steel baffles 137 are brazed to the outer surface of the cylindrical reaction vessel to guide heat transfer fluid to the outer surfaces of the reactor vessel.

Figure 7:
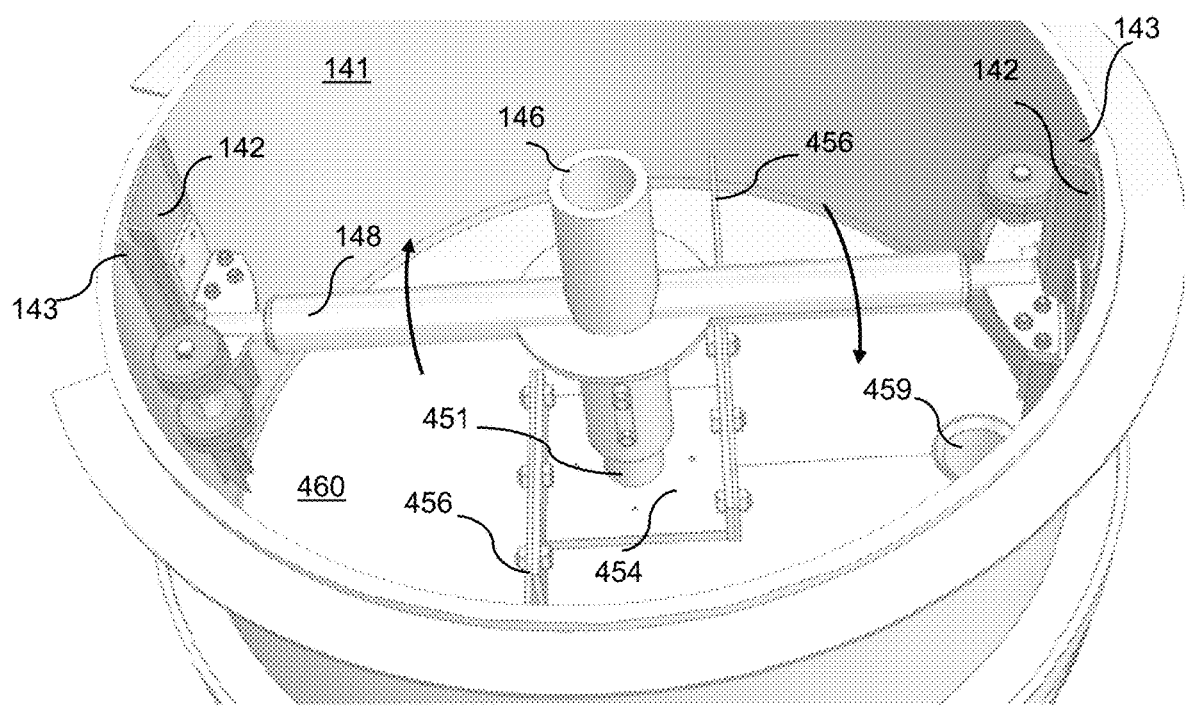
FIG. 7 is a perspective view of the bottom of a reactor vessel according to an embodiment of the invention.

FIG. 7 provides a perspective view of the bottom portion of a reactor vessel shown in FIG. 6, with the same components identified by the same reference numbers. Rotation in this view is clockwise, as indicated by the arrows on arms 148. The axis of bottom scraper 456 is offset by plate 454 so that solid material is forced toward the outlet 459.

A key aspect of the inventive approach is the combination of the mixing provided by rotating shear plates and the close proximity of that mixing to the heated surface of the reactor vessel. This combination efficiently conducts endothermic pyrolysis into the process fluid.

Much higher shear strain rates can be produced with less power via Couette flow than by other mechanical means such as impellers, paddles, or propellers. To illustrate, one can compare how viscous vs. hydrodynamic drag depends on velocity. (It is noted that sound or ultrasound achieves high strain rates but at low transduction efficiency (~10%). Furthermore, magnetic and electrical components do not perform well, or even survive, at elevated temperatures.)

The hydrodynamic drag force on the shear-plate and scraper assembly rotating at angular velocity ω (rad/sec) $=2\pi f_r=2$ rpm/60 near the cylindrical wall of a reactor vessel of radius r with tangential velocity $v_t=\omega r$ is $$F_{hy}=C_D Q A_f$$

where the dynamic pressure $$Q = \frac{1}{2}\rho v_t^2.$$

The drag coefficient $C_D$ depends on the Reynolds number $Re=\rho\, v_t\, l/\mu$ which can be estimated to lie in the range $0.5<C_D<1.5$ when ($10^2<Re<10^5$). $\mu$ is the absolute viscosity and l is a characteristic length of the body (here, $\leq 0.1$ m).

The viscous drag between a shear plate with area $A_s$ (here ~10 cm×5 m=0.5 m2) and reactor wall is $$F_{vt} = \mu\left(\frac{v_t}{\delta_r}\right)A_s,$$

where $\delta r\sim 2.5$ mm is the shear gap between plate and the reactor wall. Friction drag $F_{fr}$ on the scraper blade loaded with a light spring force $F_{sp}\sim 22N$ and further loaded by centrifugal force acting upon the mass ($m_s$=2.32 kg) is $$F_{fr}=F_n\mu_k \text{ where } F_n=F_{sp}+m_s r\omega^2$$

and the coefficient of kinetic friction $\mu_k\sim 0.2$ for a bronze scraper on a stainless steel tank wall. A simulation was run using the system parameters listed in Table 3. With hydrodynamic drag, Couette flow (viscous) drag and scraper friction drag accounted for, the simulation results, including total torque $\tau=r(F_{hy}+F_{vi}+F_{fr})$ and power $P=\omega\tau$, are shown in Table 4.

TABLE 3

| Parameter | Value |
| --- | --- |
| # of arms (scraper + shear plates) | 2 |
| Radius | 0.381 m |
| Length | 5.0 m |
| Height | 2.0 cm |
| C_D | 1.0 |
| Couette gap | 2.0 mm |
| Plate width | 10.0 cm |
| Scraper mass | 2.32 kg |
| Spring | 22.0 N |
| Friction coefficient | 0.20 |
| Fluid density (Mobiltherm 600 @50° C.) | 1200 kg/m³ |
| Fluid viscosity (Mobiltherm 600 @50° C.) | 3.03e–02 N * s/m² |

The (viscous) drag force $F_{vi}$ on shear plate assembly increases linearly with rpm while hydrodynamic force $F_{hy}$ increases as the square of the rotational speed so that hydrodynamic (pressure) drag $F_{hy}$ dominates at all rotation speeds and precludes operation at speeds much above about 60 rpm.

For a CDP plant with $m_{feed}$=100 Tons/day using a solvent oil to feed ratio of 2:1 and a process fluid density $\rho_{pf}\sim 1.0$ Ton/m³ (since $\rho_{oil}\leq 1$ Ton/m³ and $\rho_{feed}\geq 1$ Ton/m³, the volume flow rate of process fluid $V_p=3\, m_{feed}/\rho_{pf}=0.21$ m³/min.

The volume of process fluid in the reactor $V_r=(\pi/4)D^2L=2.95$ m³ so that a mean residence time of a parcel of fluid in a reactor would be $V_r/V_p=2.95/0.21=14.0$ min.

For a liquid phase pyrolysis reactor of the scale suggested herein (D=0.75 m)×L=5 m), the volume of fluid per unit of time that is processed between the reactor wall and shear plates (two per reactor) is $V'=v_t A_{gap}$. For example, if 40 rpm is chosen from Table 4 below with tangential velocity $v_t$=1.6 m/s and $A_{gap}$=(2 mm)×(5 m)×2 plates=0.025 m², then $V'$=0.04 m³/s=2.4 m³/min.

The ratio $p_f$ the volume rate of process fluid that passes between the shear plates and reactor walls and the volume rate at which its flows through the plant $V'_s/V'_p$=11.4 per reactor. Given a minimum of three reactors per plant, each parcel of process fluid will be subjected to high shear rate near a heated reactor wall an average of 34 times. (Note that this is a low estimate since the process fluid volume decreases as product leaves as vapor to the distillation columns.)

TABLE 4

| Speed (rpm) | $v_t$ (m/s) | Re (#) | Q Pa) | $F_{hv}$ (N) | $F_{vi}$ (N) | $F_{fr}$ (N) | Sdot (1/s) | Power (W) |
|---|---|---|---|---|---|---|---|---|
| 5 | 0.199 | 790 | 23.9 | 6.57 | 3.02 | 8.9 | 99.7 | 3.69 |
| 10 | 0.399 | 1,580 | 95.5 | 26.3 | 6.04 | 9.19 | 199 | 16.6 |
| 20 | 0.798 | 3,160 | 382 | 105 | 12.1 | 10.4 | 399 | 102 |
| 40 | 1.60 | 6,320 | 1,530 | 420 | 24.2 | 15 | 798 | 733 |
| 50 | 1.99 | 7,900 | 2,390 | 657 | 30.2 | 18.5 | 997 | 1,410 |
| 60 | 2.39 | 9,480 | 3,440 | 946 | 36.3 | 22.8 | 1,200 | 2,400 |
| 100 | 3.99 | 15,800 | 9,550 | 2,630 | 60.4 | 47.6 | 1,990 | 10,900 |
| 200 | 7.98 | 31,600 | 38,200 | 10,500 | 121 | 164 | 3,990 | 86,100 |

This industrial-scale V' is achieved at a strain rate $\varepsilon'$=798/s ('Sdot' in Table 4), which is equal to the maximum and roughly twice as high as the mean value over the in-plane flow field achieved by the best of the CSTR impellers described by S. Vlaev, et al. (*J. Eng. Sci. Tech.*, 2(2):177-87, 2007).

Figure 8:
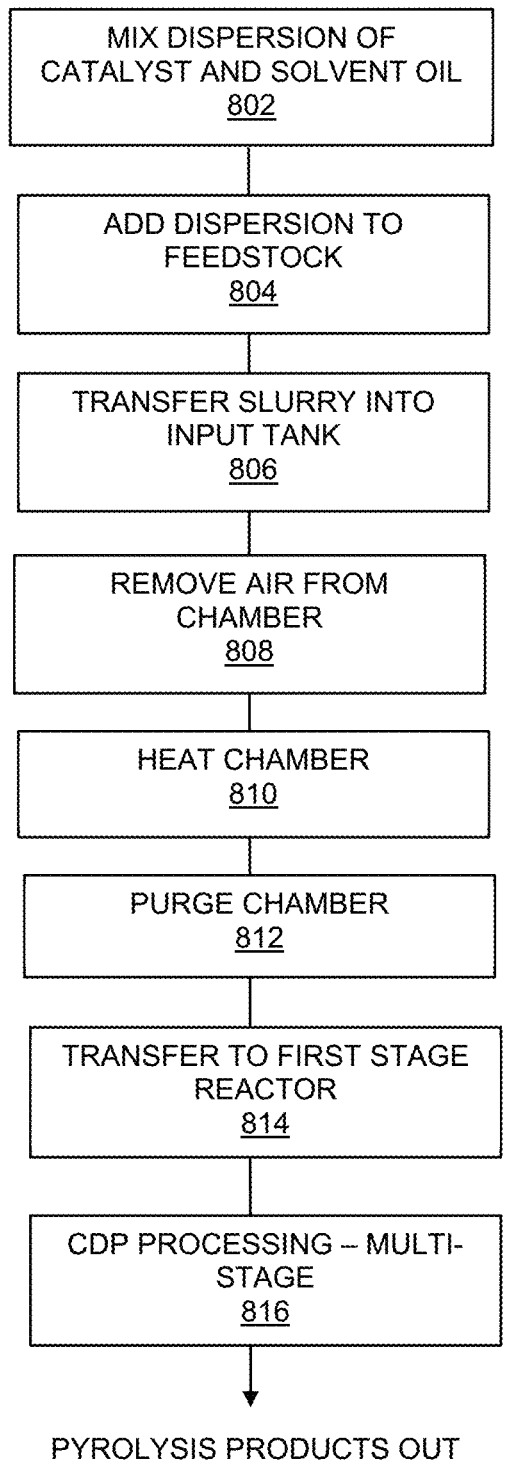
FIG. 8 is a block diagram of an exemplary preparation sequence for CDP processing.

CDP processing of feedstock using the inventive reactor includes preparation of the process fluid mixture. FIG. 9, discussed below, illustrates an exemplary set-up for such processing. Referring to FIG. 8, in step 802 fresh catalyst is mixed thoroughly with recycled solvent oil at modest temperature (~100° C.). In step 804, the oil/catalyst dispersion is added to the incoming charge of feedstock in a low speed mechanical mixer to make a slurry.

For improved efficiency, a processing set-up that includes two (or more) input tanks (see, e.g., tanks 562 in FIG. 9) allows alternating between the tanks to supply a continuous flow of reactants. While a continuous flow of reactant material is being fed into the first input tank, the pre-processing preparatory steps can be performed in another of the two or more tanks:

Step 806: a slurry pump is used to transfer the charge into the input tank.

Step 808: the charge is de-aired via a liquid ring vacuum pump.

Step 810: the charge is brought up to ~200° C. for introduction to the first stage reactor.

Step 812: chamber ullage is purged by evolved steam and other volatile gases and vapors. Column overhead gas or naphtha can be injected to complete the purge if oxygen sensors signal the necessity.

After pre-processing has been completed, in step 814 the process fluid mixture is further heated to bring up to process temperatures and is transferred into the reactor (first stage if a multi-stage set-up) for processing in step 816. The reactor motor is activated to use the combination of stirring, shear forces and heat to process the mixture as further described herein for a pre-determined period of time. As described below with reference to FIG. 9, multiple reactors may be connected in series to allow processing at different temperatures and removal of extracted components at different stages.

The cylindrical reaction vessels disclosed herein with their concentric external heat exchange shells and internal surfaces swept with rotating shear plate/scraper blades are versatile components for a wastepaper and plastic pyrolysis plant for many reasons. Advantages include: (1) they can be deployed in series so that their temperatures can be increased in stages; (2) the residence time in each temperature stage can be adjusted by (a) changing the number of reactors deployed in parallel in a temperature stage; and/or (b) changing the length of reactor(s) in a temperature stage to preserve the surface to volume ratio needed for heat exchange; and (3) a plant composed of interchangeable modules can be tailored to product demand and feedstock composition and availability.

FIG. 9 provides a schematic for one possible implementation of a CDP plant 500 incorporating the inventive shear plate reactors. Three thermal stages, i.e., low, medium and high are shown (four, if the feed/lock stage is counted) with equal length of shear plate reactors 567L, 567M and 567H, respectively, in each stage. The number of temperature stages, reactor length, and number of reactors per temperature stage can vary. For example, if diesel fuel is favored as a product, there may be multiple high temperature reactors ins series and parallel combinations, all in the diesel boiling range (up to ~390° C.) to increase the residence time of process fluid at this stage.

The use of combined heat and power (CHP) is important, if not necessary, for the economic viability of waste plastic processing. A turbine-driven electric generator (genset) is preferred over diesel since the latter rejects the majority of waste heat to its liquid cooling system at too low temperature to be useful. Accordingly, the CDP plant 500 depicted in FIG. 9 employs a molten salt transport circuit 502 (gray lines) and process steam heat transport circuit 504 (dashed lines). The solid black lines designate the solvent+polymer circuit 506. Turbine exhaust first heats molten salt in exchanger 566 and then in series generates process steam in boiler 572.

On start-up from ambient temperature the CHP gas turbine running on stored compressed gas 573, raises process steam that is directed to preheat exchanger 564s in the salt tank 563 (to which the salt circuits drain on shut-down) and to exchanger 564p to preheat the process solvent and thus the reactors as the solvent circulates. Pre-heat of still re-boiler 569 and still column 568 is accomplished by condensing process fluid vapor. In operation, one molten salt circuit heats the still re-boiler 569 and another circuit heats high, medium and low temperature reaction vessels 567H, 567M and 567L in series via concentric, baffled heat exchange shells 577.

Ground and sorted plastic is fed into hopper 561 and mixed with catalyst and solvent in feed lock tanks 562, which may work alternately to provide a continuous flow of plastic slurry for processing. With mild agitation, the charge is de-aired via a liquid ring vacuum pump before steam if admitted to tank ullage where pressure is maintained above ambient as steam admitted to the concentric heat exchange shell heats the change to 120-140° C. for introduction to the first reactor thermal stage.

The process fluid (solvent and solute polymers) progresses though the thermal-staged shear plate reactors 567H, 567M and 567L with residence times in each thermal stage adjusted as previously described by changing the vertical lengths of the reactors and the number of reactors held at the same temperature by causing the molten salt to flow in parallel through their heat exchange shells.

Vapors from each thermal stage are taken via insulated tubes 576 to different vertical heights of the distillation column 568 that matches their respective temperatures. Still "bottoms" are returned via 571 to recycle co-distilled solvent as well as high-boiling polymer fragments for another pass through the high temperature reactor 567H. Distillation "cuts" are recovered as a portion of the liquid condensate from condensers at 584 with the balance returned to the column as reflux.

Process fluid is removed from the high temperature stage and processed through a hydro cyclone 579 with underflow containing coarser particles removed at a rate that maintains the fluid levels in the reactors. The cyclone overflow circulates (via route 570) through the lower temperature reactor shells in order to exchange (recuperate) heat with the incoming fluid before recycling to the feed lock/pre-heaters 562. A decanting centrifuge or screw press 580 then processes the cyclone underflow after which the wet solids are subjected to a counter flow of steam to co-distill solvent and other adsorbed material from the surface of the coke (and coke adhered to "spent" catalyst). Steam and co-distilled species are passed to condenser 581 with air or water cooling, then to a separator 582 from which water is returned to boiler feed and the hydrocarbon phase recycled to the process fluid.

The co-distillation apparatus is a horizontal tube having a concentric screw conveyor with slide valves for inlet and exit of coke such that the tube can be sealed for the periodic circulation of steam. The last step of coke clean-up to render it suitable for use as a soil amendment or other application that is exposed to the environment avoids $CO_2$ production from coke that is burned from the catalyst as standard oil refinery practice in fluidized bed crackers.

The inventive approach introduces a number of improvements into a CDP system design by placing reactors in series with increasing temperatures:
  Moisture and volatile components of the feed material are removed at low temperature, thus saving the energy that would have been used to increase their temperature to that of a single hot reactor.
  Fresh catalyst can be added between stages.
  Since new cold material is not being added to a single hot reaction vessel, temperature can be much more uniform in each stage.
  More efficient use of a heat source by counter-flow of heat transfer fluid with the process fluid as it progresses through the stages. Spent catalyst and process fluid also counter flow with incoming process fluid.

Efficiency of the subsequent distillation process is improved: Vapor drawn off lower temperature stages can be routed either through separate smaller distillation column(s) or to a single column but at a location higher up the column that matches lower stage's vapor exit temperature.

Compared to a single large reaction vessel, multiple reaction vessels connected in series, while not a true continuous, i.e., non-stop, process, can easily approach the effect of a continuous process by controlling the residence time of reactants within the different reactors.

Regarding the final point above, a single mixed reaction vessel is inherently a batch process in which the desired reactions are given enough time to progress sufficiently toward completion before addition of a new charge. However, if reactants, catalyst and solvent are continuously added to the contents of a single reaction vessel then, to balance the build-up of spent catalyst, by-product carbon and non-reactive material, some of the reactor's contents must be continuously removed. An adverse consequence of this removal is that a proportionate amount of recently added and as-yet unreacted feedstock will also be removed from the process stream.

Given that for tanks designed with the same pressure margin of safety, the same mass of tank material will contain the same internal volume whether it is processed within one tank of large diameter or many smaller diameter tanks, it is reasonable to compare several smaller diameter tanks in series, to a single large diameter tank.

For the sake of illustration, suppose that reaction vessels are being continuously supplied with reactants and catalyst such that 10% of un-reacted feed material and catalyst "short-circuits" the process, finding its way to the exit without reacting.

With three tanks in series having the same mixing power per unit volume as the single tank and thus the same un-reacted fraction of 10%, the net un-reacted fraction for the output of the three reactors in series will be the product $(0.1)^3=0.001$ or 0.1% (i.e., the conditional probability of three successive survival events). This advantage (0.1% un-reacted vs. 10%) for the smaller tanks in series applies where mixing controls the reaction rate. When heating controls the rate, the smaller tanks in series have an even greater advantage over a single tank being used in a (pseudo-) continuous process since the smaller tanks have more area of thinner walls in contact per unit volume of process fluid.

FIG. 10 illustrates an embodiment with concentrated solar troughs. In this case the exhaust gas is routed through 'recuperator' heat exchanger to increase the efficiency of the turbine rather than to heat the chemical process.

The inventive approach introduces a number of improvements into a CDP system design by placing reactors in series with increasing temperatures:
  Moisture and volatile components of the feed material are removed at low temperature, thus saving the energy that would have been used to increase their temperature to that of a single hot reactor.
  Fresh catalyst can be added between stages.
  Since new cold material is not being added to a single hot reaction vessel, temperature can be much more uniform in each stage.
  More efficient use of a heat source by counter-flow of heat transfer fluid with the process fluid as it progresses through the stages. Spent catalyst and process fluid also counter flow with incoming process fluid.

Efficiency of the subsequent distillation process is improved: Vapor drawn off lower temperature stages can be routed either through separate smaller distillation column(s) or to a single column but at a location higher up the column that matches lower stage's vapor exit temperature.

Reaction vessels connected in series can be operated as a continuous process in which the residence time of reactants can be controlled.

(A single mixed reaction vessel is inherently a batch process. Otherwise, if reactants, catalyst and solvent are continuously added to the contents of a single reaction vessel then, to balance the build-up of spent catalyst, by-product carbon and non-reactive material, some of the reactor's contents must be continuously removed. An adverse consequence of this removal is that a proportionate amount of recently added and as-yet unreacted feedstock will also be removed from the process stream.)

As will be apparent to those of skill in the art, different combinations of the various elements and components described herein may be made to achieve the intended goal of providing an effective and efficient system and method for recycling of plastics and other hydrocarbons. Accordingly, the illustrative examples provided herein and shown in the drawings are not intended to be limiting.

The invention claimed is:

1. A reactor vessel for liquid phase catalytic pyrolysis of plastics in a slurry of plastic particles, solvent oil, and a catalyst, the reactor vessel comprising:
   a cylindrical reactor barrel having a barrel diameter and a barrel length;
   an inlet for introducing the slurry into the reactor barrel for treatment;
   a heat exchange shell surrounding the reactor barrel, the heat exchange shell connected to a heat exchange circuit and configured to flow a heat exchange fluid over an outer surface of the reactor barrel;
   a reactor top plate disposed at a top of the reactor barrel;
   a reactor bottom plate disposed at a bottom of the reactor barrel;
   a central shaft supported concentrically and rotatably within the reactor barrel;
   at least one arm set extending radially from the central shaft, each arm of the at least one arm set having a distal end;
   a shear plate supported perpendicularly on the distal end of each arm, the shear plate having a plate surface with a plate area, the plate surface extending parallel to each of the central shaft and an inner wall of the reactor barrel to define a shear gap between the plate surface and the inner wall of approximately 2 mm to 3 mm, wherein, when the central shaft is rotated within the reactor barrel, the shear gap is dimensioned to induce viscous drag at a predetermined strain rate within the slurry between the plate surface and the inner wall via Couette flow;
   a drive motor supported by the reactor top plate and configured for driving rotation of the central shaft; and
   at least one outlet for removing pyrolysis products from the reactor barrel.

2. The reactor vessel of claim 1, where each arm further supports a scraper configured to remove solids deposited on the inner wall, the scraper having a length corresponding to a length of the shear plate.

3. The reactor vessel of claim 1, wherein the at least one arm set comprises a plurality of arm sets spaced apart along a length of the central shaft, and wherein one arm of each of the plurality of arm sets supports a single shear plate having a shear plate length substantially equal to the barrel length.

4. The reactor vessel of claim 1, wherein a trailing edge of the shear plate is curved away from the inner wall to diffuse fluid flow and direct the slurry away from the inner wall.

5. The reactor vessel of claim 1, wherein each arm comprises a piston configured to apply variable pressure against the distal end of the arm.

6. The reactor vessel of claim 1, further comprising an electrically-conductive wire extending through each arm, the wire having a distal end electronically connected to the shear plate and a proximal end connected to a conductivity detector configured to indicate physical contact between the shear plate and the inner wall.

7. The reactor vessel of claim 1, wherein the heat exchange circuit comprises a molten salt circuit.

8. The reactor vessel of claim 7, wherein the molten salt circuit comprises solar concentrators.

9. The reactor vessel of claim 1, wherein the predetermined strain rate is approximately $10^2$ to $10^3$ per second.

10. The reactor vessel of claim 1, wherein an aspect ratio between the barrel length and the barrel diameter is within a range of 5:1 and 10:1.

11. The reactor vessel of claim 1, wherein the drive motor is a hydraulic motor configured to drive rotation of the central shaft at 40 to 60 rpm.

12. A processing facility comprising a plurality of reactor vessels of claim 1, wherein the reactor vessels are connected in series.

13. The processing facility of claim 12, where each of the plurality of reactor vessels is configured to operate at a different processing temperature, wherein the processing temperatures progressively increase from a first reactor in the series to a final reactor in the series.

14. The processing facility of claim 13, comprising a plurality of input tanks connected in parallel, each having an outlet in fluid communications with a first reactor vessel, wherein material to be processed is pre-processed in alternating input tanks to provide a substantially continuous flow of material into the first reactor vessel.

15. A method for recycling or upcycling of plastics comprising:
   mixing a dispersion of particles of plastic, solvent oil and a catalyst to form a slurry;
   heating the slurry to a processing temperature;
   feeding the heated slurry into the reactor vessel of claim 1 to process the slurry.

16. An improved reactor vessel for liquid phase catalytic pyrolysis of plastics in a slurry of plastic particles, solvent oil, and a catalyst, the improvement comprising a shear plate assembly disposed on a rotatable shaft concentrically disposed within a cylindrical reactor vessel, the shear plate assembly comprising a shear plate disposed perpendicularly on an arm extending radially from the shaft, parallel to and at a spacing from an inner vessel wall surface to define a shear gap of approximately 2 mm to 3 mm, the shear gap configured to generate a viscous drag at a predetermined strain rate within the slurry via Couette flow between the inner vessel wall surface and an outer surface of the shear plate when the shear plate and arms rotate within the vessel.

17. The improved reactor vessel of claim 16, further comprising a scraper disposed on a leading edge of the shear plate to remove material deposited on the inner vessel wall surface.

18. The improved reactor vessel of claim 16, further comprising a heat exchange shell surrounding the reactor vessel, the heat exchange shell connected to a heat exchange circuit and configured to flow a heat exchange fluid over an outer surface of the reactor vessel.

19. The improved reactor vessel of claim 18, wherein the heat exchange circuit comprises a molten salt circuit.

20. The improved reactor vessel of claim 19, wherein the molten salt circuit comprises solar concentrators.

21. The improved reactor vessel of claim 16, wherein the arms comprise a plurality of arm sets spaced apart along a length of the rotatable shaft, and wherein one arm of each of the plurality of arm sets supports a single shear plate having a shear plate length corresponding to a length the reactor vessel.

22. The improved reactor vessel of claim 16, wherein a trailing edge of the shear plate is curved away from the inner vessel wall surface to diffuse fluid flow and direct the slurry away from the inner vessel wall surface.

23. The improved reactor vessel of claim 16, wherein each arm comprises a piston configured to apply variable pressure against a distal end of the arm.

24. The improved reactor vessel of claim 16, further comprising an electrically-conductive wire extending through each arm, the wire having a distal end electronically connected to the shear plate and a proximal end connected to a conductivity detector configured to indicate physical contact between the shear plate and the inner wall surface.

25. The improved reactor vessel of claim 16, wherein the viscous drag corresponds to a strain rate of approximately $10^2$ to $10^3$ per second.

26. The improved reactor vessel of claim 16, wherein an aspect ratio between a reactor vessel length and a reactor vessel diameter is within a range of 5:1 and 10:1.

27. The improved reactor vessel of claim 16, further comprising a hydraulic motor configured to drive rotation of the rotatable shaft at 40 to 60 rpm.

28. A method for recycling or up-cycling of plastics comprising:
   mixing a dispersion of particles of plastic, solvent oil and a catalyst to form a slurry;
   heating the slurry to a processing temperature;
   feeding the heated slurry into at least one reactor vessel of claim 16 to process the slurry.

* * * * *